United States Patent [19]

Rodriguez et al.

[11] Patent Number: 4,548,792
[45] Date of Patent: Oct. 22, 1985

[54] METHOD FOR PRECIPITATING VANADIUM FROM VANADIUM BEARING LIQUORS AND RECOVERING VANADIUM PENTOXIDE

[75] Inventors: Domingo Rodriguez, Los Teques; Roberto Schemel, San Antonio de Los Altos; Ramon Salazar, Caracas, all of Venezuela

[73] Assignee: Intevep, S.A., Caracas, Venezuela

[21] Appl. No.: 589,949

[22] Filed: Mar. 15, 1984

[51] Int. Cl.$^4$ .................. C01G 31/00; C01G 53/04
[52] U.S. Cl. ................................. 423/65; 423/62; 423/66; 423/140; 423/150; 423/64
[58] Field of Search ............... 423/62, 68, 65, 140, 423/66

[56] References Cited

U.S. PATENT DOCUMENTS

| | | | |
|---|---|---|---|
| 828,850 | 8/1906 | Haynes et al. | 423/66 |
| 1,430,864 | 10/1922 | Thews | 423/66 |
| 4,039,582 | 8/1977 | Nasyrov et al. | 423/66 |

FOREIGN PATENT DOCUMENTS

| | | | |
|---|---|---|---|
| 54-114412 | 6/1979 | Japan | 423/68 |
| 1167829 | 10/1969 | United Kingdom | 423/68 |

*Primary Examiner*—H. T. Carter
*Attorney, Agent, or Firm*—Bachman & LaPointe

[57] ABSTRACT

A method for precipitating vanadium from vanadium bearing liquors comprises adjusting the pH of the vanadium bearing liquor with a precipitating agent selected from the hydroxides of Na, K and Ca to a range of about 5.5 to 6.5, preferably 6.0 to 6.2 so as to precipitate vanadium in the trivalent and tetravalent states. Remaining traces of vanadium are then cemented by additions of calcium hydroxide, calcium oxide or mixtures thereof. The dried precipitate is then heated in the presence of air and Na and/or K so as to form a reaction product in the form of a water soluble salt which, when dissolved in water, results in vanadium in its pentavalent state.

17 Claims, 1 Drawing Figure

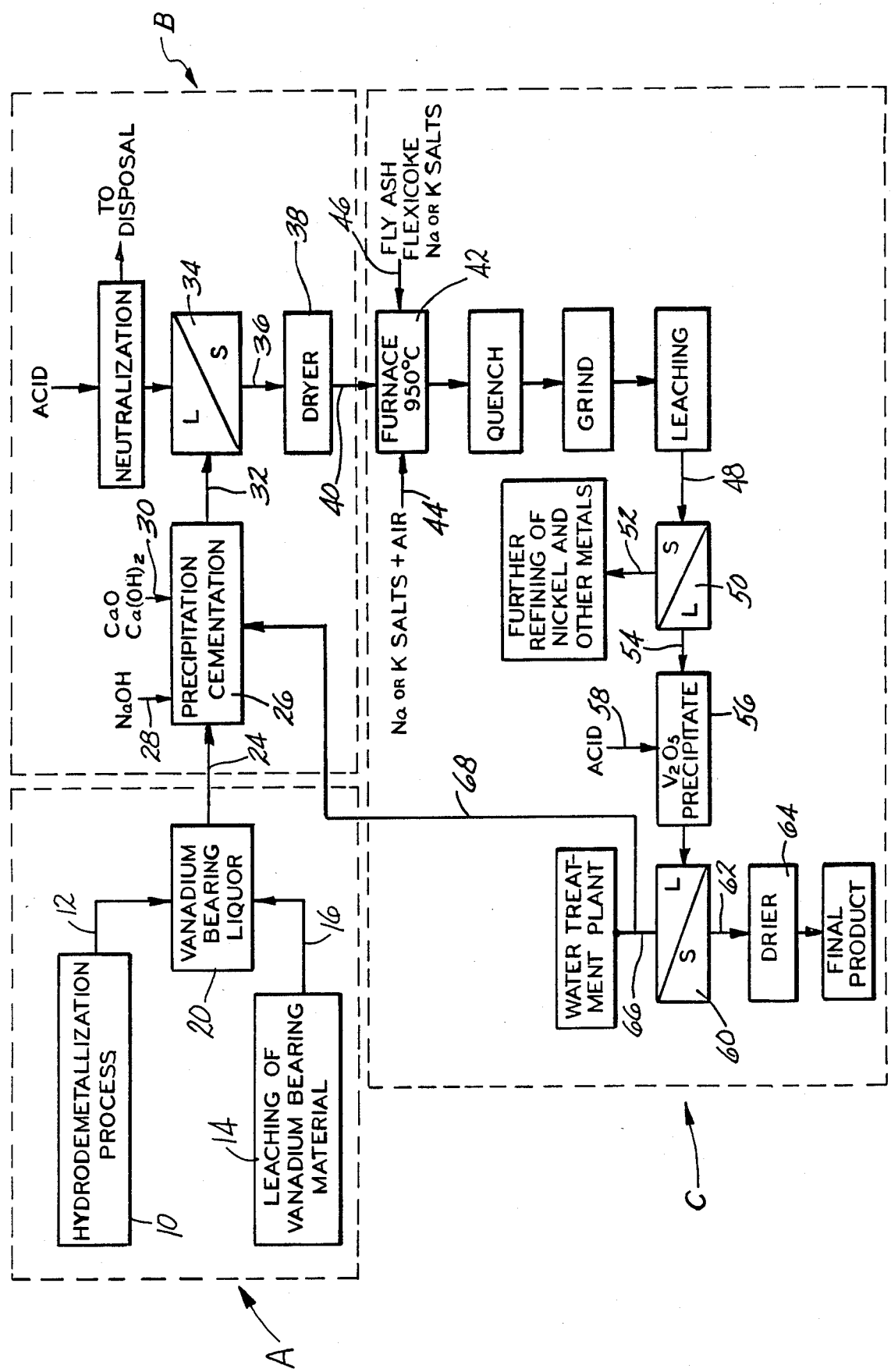

METHOD FOR PRECIPITATING VANADIUM FROM VANADIUM BEARING LIQUORS AND RECOVERING VANADIUM PENTOXIDE

BACKGROUND OF THE INVENTION

The present invention relates to a method for precipitating vanadium from vanadium bearing liquors and, more particularly, a method for precipitating vanadium in the tetravalent and trivalent states and recovering vanadium pentoxide.

Various commercial processes used in the petroleum industry generate by-products which contain rather high concentrations of vanadium and nickel in addition to smaller concentrations of other metals. These by-products include, for example, HDM liquor which is a by-product of the hydrodemetallization processing of heavy crudes, flexicoke from the gasification process as well as others. The HDM liquor contains up to 22 grams per liter of vanadium while flexicoke contains up to 12% vanadium. As vanadium finds use in various fields such as the preparation of ferro-alloys, as a catalyst and in the production of other products, it is highly desirable to recover high purity vanadium in the form of vanadium pentoxide from the above-noted by-products in an economical and efficient manner.

Heretofore, the recovery of vanadium from vanadium bearing liquors required oxidizing the vanadium bearing liquor such that the vanadium cation species is at its highest oxidation level, that is, its pentavalent state. After the vanadium has been oxidized in solution to its pentavalent state, it is precipitated by treating the liquor with a precipitating agent such as ammonia ($NH_3$) or ammonium chloride ($NH_4Cl$) so as to adjust the pH of the solution of 2 thereby precipitating vanadium pentoxide ($V_2O_5$) and ammonium metavanadate $NH_4VO_3$, respectively. The ammonium metavanadate may then be washed, dried and calcined to produce a vanadium pentoxide product. A typical precipitation method is disclosed in Canadian Pat. No. 783,006. While the foregoing process has been useful in recovering vanadium, it does suffer from a number of disadvantages. The primary disadvantage is that the purity of the vanadium pentoxide product is generally below 87% $V_2O_5$. In addition, the process tends to be inefficient in that only 90% of the vanadium in solution is precipitated.

In light of the foregoing, it would be highly desirable to provide a process for precipitating and recovering vanadium from vanadium bearing liquors, particluarly HDM liquor produced during the hydrodemetallization processing of heavy crudes, in a simple, efficient and economic manner.

Accordingly, it is the principal object of the present invention to provide a method for precipitating and recovering vanadium from vanadium bearing liquors.

It is a particular object of the present invention to provide a method for precipitating vanadium in the tetravalent and trivalent states.

It is a further object of the present invention to provide a method for precipitating vanadium in the tetravalent and trivalent states from HDM vanadium bearing liquors.

Further objects and advantages of the present invention will appear hereinbelow.

SUMMARY OF THE INVENTION

In accordance with the present invention the foregoing objects and advantages are readily obtained.

The present invention relates to a method for precipitating vanadium from vanadium bearing liquors and, more particularly, a method for precipitating vanadium in the tetravalent and trivalent states and recovering vanadium pentoxide. The process of the present invention can employ any vanadium bearing liquor and has been found to be particularly useful in treating HDM liquors produced during the hydrodemetallization of heavy crudes. Other suitable vanadium bearing liquors are those obtained from leaching vanadium bearing materials such as those leach liquors described in copending application Ser. No. 589,951 which is assigned to the assignee of the instant invention. In accordance with the present invention, the vanadium bearing liquor which generally has a pH of less than 1.0 is treated with a precipitating agent selected from the group consisting of hydroxides of sodium (Na), potassium (K) and calcium (Ca) so as to adjust the pH of the solution to about 5.5 to 6.5 and preferably about 6.0 to 6.2 thereby precipitating vanadium in the trivalent and tetravalent states. Any remaining traces of vanadium are then cemented by additions of calcium hydroxide, calcium oxide or mixtures thereof. The pH of the solution is then adjusted to about 8.5 to 9.5 and preferably about 9.0 with the precipitating agent thereby allowing any nickel in solution to precipitate. The precipitate is then dried and thereafter heated in the presence of air and Na and/or K so as to form a reaction product in the form of a water soluble salt. The reaction product is thereafter dissolved in hot water so as to render vanadium into solution in its pentavalent state from which vanadium pentoxide is precipitated by pH adjustment and recovered.

When employing the process of the present invention as outlined above vanadium pentoxide having a purity of more than 98% $V_2O_5$ is recovered. In addition, 99% of the vanadium species in solution is precipitated by the process of the present invention.

BRIEF DESCRIPTION OF THE DRAWING

The FIGURE is a schematic illustration of the method of the present invention.

DETAILED DESCRIPTION

Referring to the drawing, a process is illustrated which comprises three steps; a vanadium bearing liquor production generating step A, and the precipitating step B and refining step C of the present invention. With reference to step A, as noted previously, the vanadium bearing liquor 20 to be precipitated is derived from any one of a number of sources. A particularly suitable source for the process of the present invention is the HDM liquor 12 which is a by-product of the hydrodemetallization processing 10 of heavy crudes. Other sources include leach liquors 16 which result from leaching vanadium bearing materials 14.

The pregnant vanadium bearing liquor 20 generally has a pH of less than 1.0 and, depending on the source of the liquor, a vanadium concentration of from ppm to grams/liter of liquor. The pregnant liquor is passed through line 24 to precipitator 26 where, in accordance with the present invention, vanadium and nickel is precipitated in a single step. In the precipitator 26 the pregnant leach liquor is contacted with a precipitating agent such as preferably hydroxides of sodium (Na), potassium (K) and calcium (Ca) charged through line 28. In accordance with the preferred embodiment of the present invention sodium and potassium hydroxides are preferred because, firstly, calcium tends to contaminate the liquor and, secondly and more importantly, the presence of sodium and/or potassium is required to form the reaction product in furnace 42 as will be explained hereinbelow. Since acid/basic reactions, which is the case of this step, are usually exothermic it is suggested to maintain the temperature of the reactor to room temperature or ideally to 20° C. in order to improve the precipitation of the elements contained in solution by decreasing their solubility. The pH of the pregnant liquor in the precipitator is adjusted to a range of from about 5.5 to 6.5, preferably 6.0 to 6.2. By adjusting the pH with sodium hydroxide or other precipitating agent the vanadium is precipitated in the trivalent and tetravalent states. After the pH is adjusted, the traces of vanadium remaining in solution are cemented by charging the precipitator via line 30 with calcium hydroxide, calcium oxide, or mixtures thereof. The pH of the solution in the precipitator 26 is then further adjusted with sodium hydroxide charged through line 28 until the pH is about 8.5 to 9.5 and preferably about 9 so as to allow for any nickel in the liquor to precipitate. After precipitation the solution is withdrawn from precipitator 26 through line 32 to a separator 34 wherein the solution is filtered and the liquid effluent neutralized with an acid solution such as hydrochloric acid, sulfuric acid and/or nitric acid, hydrochloric acid being preferred. Tests performed in a laboratory indicate that this process precipitates the majority of vanadium and nickel in solution and the concentration of vanadium and nickel in the final effluent irregardless of the initial concentration of vanadium and nickel in the liquor is less than 6 ppm vanadium and less than 1 ppm nickel. Although not shown in illustration, it is known that if the concentration of vanadium is higher than 6 ppm due to irreversible changes in operational conditions, more $Ca(OH)_2$ can be added (proportional to vanadium concentration) to the filtered liquor obtained from separator 34 to cement the excess vanadium present in the liquor. The precipitate is then transported via line 36 to drier 38 and from drier 38 is taken via line 40 to furnace 42. The temperature of the furnace 42 is maintained at a temperature of from about 500° C. to 1000° C., preferably 750° C. to 1000° C. and ideally about 950° C. The furnace is lined with fused alumina refractory. Air is introduced into the furnace via line 44 at a rate depending on the size of the furnace and the carbon content of the feedstock, such that the vanadium present in the precipitate forms a reaction product and becomes a water soluble salt. Where hydroxides of sodium and potassium were used as the precipitating agents there is generally enough Na or K in the precipitate to form the reaction product, that is, the water soluble salt. In the event Na or K are not present in the required amount or were not used as the precipitating agent then Na and K salts are added to the furnace along with the air. It should be noted that in addition to the precipitate being charged to furnace 42 via line 40 additional flexicoke or fly ash may be charged to the furnace via line 46 along with Na and K salts where necessary. The product from 46 is then quenched and the slag is ground and dissolved in hot water at a temperature of about 70° C. to 100° C. After dissolving the slag in water the vanadium will be in solution in its pentavalent state and the rest of the metals will be solids. The solution is then delivered via line 48 to separator 50 where the solution is filtered and the solids are removed via line 52 for further refining as desired. The liquid is then delivered to precipitator 56 via line 54 wherein the vanadium is precipitated in the form of pure vanadium pentoxide by simple adjustment of pH by a charge of acid solution such as hydrochloric, nitric or sulfuric, preferably hydrochloric acid through line 58. The solution is then delivered to separator 60 where it is filtered and the solids are delivered via line 62 to a drier 64 and the liquid effluent which still contains a small amount of vanadium in solution may be removed via line 66 for further treatment. In addition, the vanadium containing solution may be returned via line 68 to the precipitator 26 for further treatment.

It should be appreciated that the following examples are given for purposes of illustrating the process of the present invention and it is to be understood that these examples are not intended to limit the generally broad scope of the present invention in strict accordance therewith and that the amounts of the promoters and precipitating agents, temperature, etc. may vary from case to case depending on the feedstock employed.

EXAMPLE 1

500 ml of HDM vanadium bearing liquor having a vanadium concentration of approximately 22 grams/liter and a nickel concentration of 2 grams/liter was transferred to a precipitator where the pH of the pregnant leach liquour solution was adjusted to 6.2 by the addition of a solution containing 40 wt.% sodium hydroxide (NaOH) so as to precipitate vanadium in its trivalent and tetravalent states. The temperature of the solution was maintained at room temperature. Once the pH of the solution was adjusted and the vanadium precipitated out the remaining traces of vanadium in the solution were cemented by adding 32 grams of calcium hydroxide $Ca(OH)_2$ to the solution and mixing the solution until the pH and potentiality of the solution were stable. The pH of the solution was then increased to 9.2 with further additions of the 40% by weight sodium hydroxide (NaOH) solution so as to allow for the nickel in solution to precipitate. The solution was thereafter withdrawn from the precipitator and filtered and the liquid effluent was then neutralized with hydrochloric acid. The final vanadium concentration in the liquid effluent was 6 ppm and the nickel concentration was less than 1 ppm.

The precipitate obtained was then dried and placed in a furnace at a temperature of 950° C. for 4 hours in the presence of air. The resultant reactive product was thereafter quenched and ground and therafter placed in hot water at a temperature of 90° C. wherein the vanadium went into solution in a pentavalent state. The solution was thereafter filtered and the pH of the resultant liquid was adjusted to 2 by the addition of a hydrochloric acid solution wherein 90% of the resultant vanadium precipitated out as a red mud which is then dried to produce the final product of vanadium.

EXAMPLE 2

1.5 liters of an acid pregnant solution having a vanadium concentration of about 22 grams/liter and a nickel concentration of 2 grams/liter were placed in a precipitator at room temperature. The pregnant liquor was agitated by stirring and the pH adjusted to 6.0 by adding 360 ml of a 50 wt.% solution of sodium hydroxide. Once the pH was adjusted to 6.0 and the vanadium was precipitated the pH of the solution was adjusted to 8.5 by the addition of 100 ml of a 10 wt.% solution of $CaOH_2$. The pH of solution was then increased to 9.5 by the addition of 100 ml of a 50 wt.% solution of $CaOH_2$ to precipitate nickel. The solution was thereafter withdrawn from the precipitator and filtered and the liquid effluent was neutralized with hydrochloric acid. The final concentration of vanadium in the liquid effluent was less than 4 ppm and the nickel concentration was less than 1 ppm.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A process for precipitating vanadium and nickel from vanadium-nickel bearing liquors comprising the steps of providing a pregnant liquor containing vanadium and nickel; adjusting the pH of said pregnant liquor with a precipitating agent to a pH in the range of from about 5.5 to 6.5 so as to precipitate vanadium in its trivalent and tetravalent states wherein said precipitating agent is a material selected from the group consisting of hydroxides of sodium, potassium, calcium and mixtures thereof; and further adjusting the pregnant liquor with said precipitating agent to a pH in the range of from about 8.5 to 9.5 so as to precipitate nickel oxide.

2. A process according to claim 1 wherein the pH of the pregnant liquor prior to adjustment with said precipitating agent is less than 1.

3. A process according to claim 1 wherein said pregnant liquor is a HDM liquor derived from the hydrodemetallization processing of heavy crudes.

4. A process according to claim 1 further including the steps of separating and drying the precipitates from said solution and heating said dried precipitates in a furnace at a temperature of from about 500° C. to 1000° C. in the presence of air and salt so as to oxidize said vanadium precipitate to its pentavalent state so as to form a water soluble salt reaction product.

5. A process according to claim 4 wherein said salt is selected from the group consisting of hydroxides of sodium, potassium, calcium and mixtures thereof.

6. A process according to claim 4 further including the step of dissolving said reaction product in water wherein vanadium goes into solution in its pentavalent state.

7. A process according to claim 6 further including the steps of filtering the solution and adjusting the pH of the resultant liquor to about 2 so as to precipitate out vanadium pentoxide.

8. A process according to claim 7 wherein said solution is adjusted with an acid solution.

9. A process according to claim 7 further including the steps of separating said precipitate from said resultant liquid solution and drying said precipitate so as to produce vanadium pentoxide.

10. A process according to claim 9 further including the steps of recycling said resultant liquor solution to said precipitating zone.

11. A process according to claim 4 wherein the temperature of the furnace is maintained at about 950° C.

12. A process according to claim 4 wherein said separated liquid effluent is neutralized with an acid solution.

13. A process according to claim 1 wherein said pH is adjusted to about 6.2.

14. A process according to claim 1 wherein said precipitating agent is sodium hydroxide.

15. A process according to claim 1 wherein said pH is adjusted to about 9.

16. A process according to claim 1 further including the steps of cementing the vanadium traces in solution by the addition of a cementing agent selected from the group consisting of calcium hydroxide, calcium oxide and mixtures thereof.

17. A process according to claim 16 wherein said cementing agent is calcium hydroxide.

* * * * *